United States Patent
Jonsson

(10) Patent No.: US 8,172,048 B2
(45) Date of Patent: May 8, 2012

(54) BRAKING DEVICE FOR A ROBOT DRIVE AND METHOD OF DETECTING A BRAKING STATE

(75) Inventor: Ingvar Jonsson, Västerås (SE)

(73) Assignee: ABB Technology AG, Zurich (CH)

( * ) Notice: Subject to any disclaimer, the term of this patent is extended or adjusted under 35 U.S.C. 154(b) by 845 days.

(21) Appl. No.: 12/086,746

(22) PCT Filed: Dec. 5, 2006

(86) PCT No.: PCT/EP2006/011626
§ 371 (c)(1),
(2), (4) Date: Nov. 14, 2008

(87) PCT Pub. No.: WO2007/073831
PCT Pub. Date: Jul. 5, 2007

(65) Prior Publication Data
US 2009/0145699 A1    Jun. 11, 2009

(30) Foreign Application Priority Data
Dec. 19, 2005   (DE) .................... 10 2005 061 111

(51) Int. Cl.
*B60T 13/74* (2006.01)
(52) U.S. Cl. ...................................... 188/171; 188/158
(58) Field of Classification Search ............. 188/1.11 E, 188/1.11 L, 1.11 W; 303/20
See application file for complete search history.

(56) References Cited

U.S. PATENT DOCUMENTS

| | | | |
|---|---|---|---|
| 6,217,131 B1 * | 4/2001 | Schanzenbach | 303/112 |
| 6,422,659 B2 * | 7/2002 | Disser | 303/20 |
| 6,435,625 B1 * | 8/2002 | Schwarz et al. | 303/20 |
| 6,464,308 B2 * | 10/2002 | Kubota | 303/20 |
| 6,655,507 B2 * | 12/2003 | Miyakawa et al. | 188/171 |
| 6,662,906 B1 * | 12/2003 | Bohm et al. | 188/1.11 E |
| 6,848,756 B2 * | 2/2005 | Maron et al. | 303/155 |
| 7,185,745 B2 * | 3/2007 | Godlewsky et al. | 188/158 |
| 7,464,795 B2 * | 12/2008 | Hurwic | 188/1.11 E |
| 7,475,760 B2 * | 1/2009 | Longuemare et al. | 188/156 |
| 7,726,748 B2 * | 6/2010 | Zumberge | 303/155 |
| 2003/0061872 A1 * | 4/2003 | Giessler | 73/121 |

FOREIGN PATENT DOCUMENTS

| | | |
|---|---|---|
| DE | 195 19 434 C1 | 12/1996 |
| DE | 101 47 817 A1 | 5/2003 |
| JP | 2-218588 A | 8/1990 |

OTHER PUBLICATIONS

International Search Report.

* cited by examiner

*Primary Examiner* — Christopher Schwartz
(74) *Attorney, Agent, or Firm* — Buchanan Ingersoll & Rooney PC

(57) ABSTRACT

Method of detecting a braking state of a braking device of a robot drive, having a frame device which, if required, applies braking forces to a rotating component of the robot drive by means of a first movable frame element. As a result, the braking device is shifted into at least two operating states, in particular a closed state or an open state. In the process, during the transition of the braking device from one state into the other, at least one measuring signal is recorded and a braking state is determined by comparing the at least one measuring signal with reference values established beforehand. The invention also relates to a braking device on which the above method can be carried out.

24 Claims, 2 Drawing Sheets

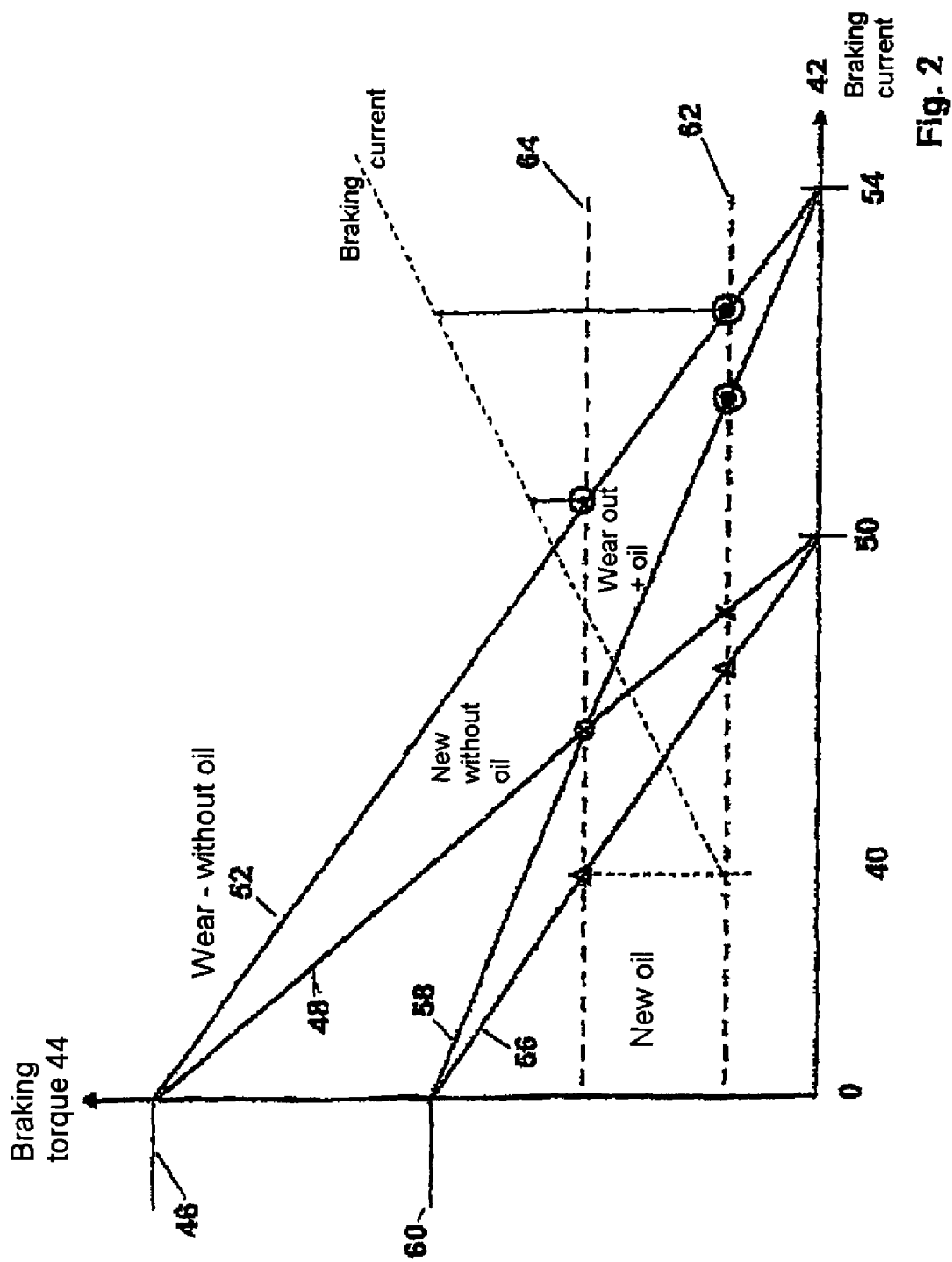

BRAKING DEVICE FOR A ROBOT DRIVE AND METHOD OF DETECTING A BRAKING STATE

The invention relates to a method for identification of a brake state of a braking apparatus of a robot drive, and to a braking apparatus for a robot drive having a drive shaft on which a braking element is arranged, having a frame apparatus by means of which the braking forces can be applied to the braking element when required, with the frame apparatus having a first frame element which can be moved to a first position and a second position, with one of the positions corresponding to a "brake open" operating state, and the other position corresponding to a "brake closed" operating state.

Braking apparatuses such as these for robot drives are generally known, for example in the form of a disk braking apparatus. The brake pads are gradually worn away by the use of such brakes, so that it is possible after a certain usage time of the brake to exhibit decreasing braking performance, or to fail completely. In order to avoid this, the thickness of the brake pads, for example, is measured during inspections, or is checked by means of regular visual inspections.

Against the background of this prior art, one object of the invention is to specify a method for identification of a brake state of a braking apparatus of a robot drive, by means of which the brake state can be detected particularly easily. A further object of the invention is to specify a corresponding braking apparatus by means of which the method to be specified can be carried out particularly easily.

This object is achieved by a method for identification of a brake state having the features specified in patent claim 1, and by a braking apparatus for a robot drive having the features specified in patent claim 15.

According to the invention, the method for identification of a brake state of a braking apparatus of a robot drive has a frame apparatus which applies braking forces to a rotating component of the robot drive when required by means of a first moving frame element. In this case, the braking apparatus is moved to at least two operating states of the brake, in particular to an open state or to a closed state, with a measurement signal being recorded during the transition of the braking apparatus from the first operating state to the second operating state. Finally, a brake state of the brake is determined by comparison of the measurement signal with previously defined reference values.

This advantageously means that the brake state of the braking apparatus is detected just by a single change from one operating state to a second operating state.

It is also advantageous for the closed state of the brake to be chosen as the first position, and for the open state of the brake to be chosen as the second position.

One advantageous refinement of the method according to the invention provides for the first frame element to be moved from the first position to the second position by means of at least one electromagnetically acting holding apparatus.

This is, for example, an actuated electromagnet which intrinsically attracts the frame element when activated.

It is also particularly advantageous in the case of the above-mentioned refinement for the current level or the current level profile of the electromagnetically acting holding apparatus to determine the field strength of the electromagnet. This signal is used to determine the distance of a first frame element from the first position to the second position. Specifically, this makes use of the physical effect that a greater field strength and thus a greater current level is required in the electromagnet as the distance from the first frame element to the electromagnet increases, in order to move the frame element from its first position to the second position.

The object is also achieved by a braking apparatus for a robot drive having the features claimed in patent claim 15.

According to this claim, a braking apparatus of the type mentioned initially is characterized in that at least one measurement signal for the distance of the first frame element between its positions can be recorded by means of a measurement apparatus, and in that a brake state is determined by means of an evaluation apparatus, by comparison of the measurement signal with a reference value.

In one simple refinement of the braking apparatus according to the invention, the measurement apparatus is, for example, a distance sensor which, as a separate component in the brake, carries out a direct measurement to measure the required distance between the first position and the second position of the first frame element. Specifically, this distance is dependent on the state of the brake, in particular on the layer thickness of the brake pads, which are either fitted to the rotating part of the braking apparatus, for example as a brake disk, and/or are fitted to the first frame element and/or to a part of the frame apparatus.

It is particularly advantageous if the first frame element can be moved from its first position to the second position by means of an electromagnetically acting holding apparatus.

In this case, the holding apparatus can also be used as the measurement apparatus, specifically by using the required current level or the current level profile for movement of the first frame element as the measurement signal. This allows a so-called indirect measurement of the distance to be carried out.

The advantages according to the invention are achieved technically in a particularly simple manner in this way.

Further advantageous refinements of the braking apparatus according to the invention and of the method according to the invention can be found in the further dependent claims.

The invention, advantageous refinements and improvements of the invention, and their particular advantages will be explained and described in more detail with reference to the exemplary embodiments which are illustrated in the drawings, in which:

FIG. 2 shows a graph with measured value examples.

FIG. 1 shows a braking apparatus 10 according to the invention illustrated schematically, in the form of a section view, although the normal shadings in technical drawings have been omitted.

Figure 1:
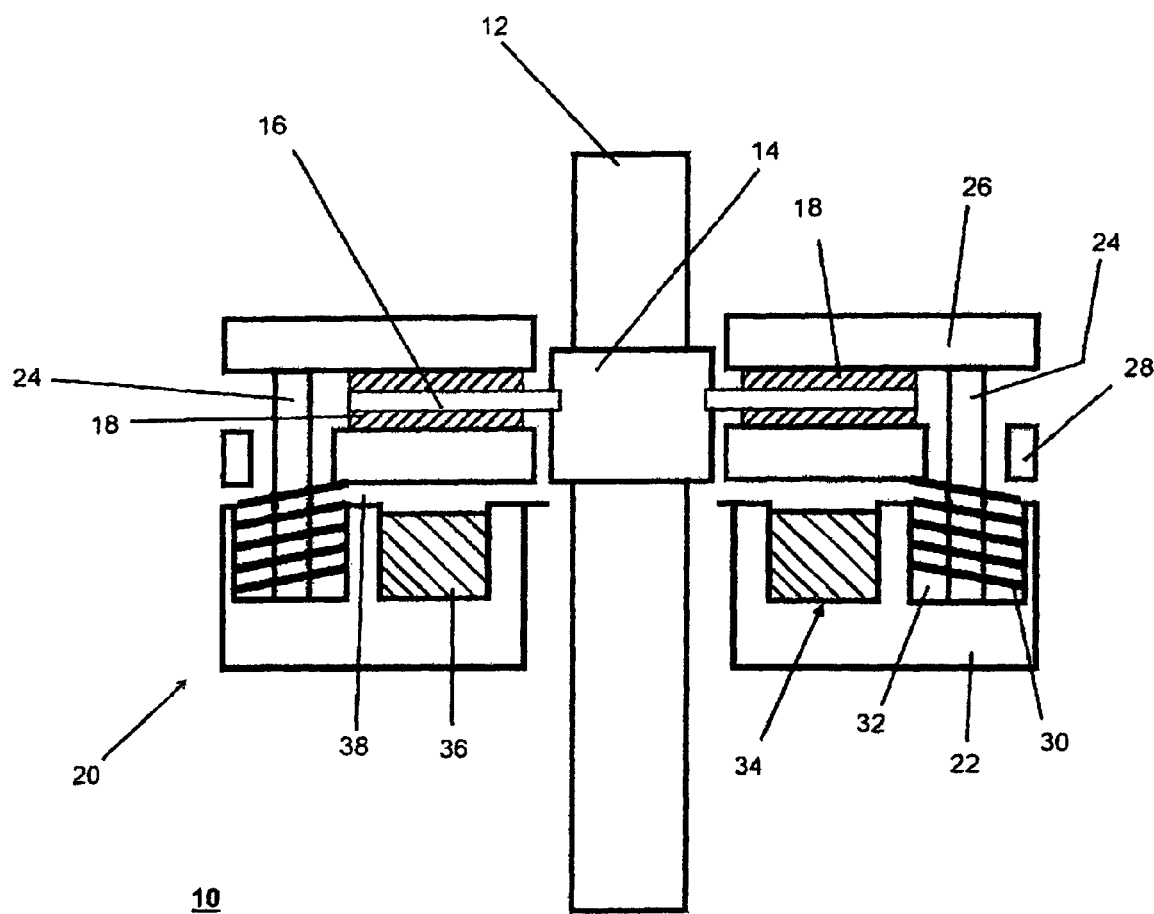
FIG. 1 shows a schematic illustration of a braking apparatus.

The figure shows a drive shaft 12 which is connected to a robot drive that is not illustrated in any more detail, in particular a servo motor, possibly with the interposition of a gearbox. A connecting element 14 is fitted to the drive shaft 12 and, for example, is firmly connected to the drive shaft 12 as a shrunk-on sleeve. The connecting element 14 itself is used as a mount for a brake disk 16 and is appropriately connected to it. On each of its two surfaces which point in the axial direction of the drive shaft 12, the brake disk 16 has a brake pad 18, which is connected to the brake disk 16 as an annular body in each case, starting from the outer radial edge of the brake disk 16 to the area close to the connecting element 14. The area on which braking forces are transmitted from the braking apparatus 10 to the brake disk is thus particularly large and is designed technically advantageously.

Furthermore, a frame apparatus 20 is shown, which passes the braking forces to be transmitted to the brake disk 16 to a brake housing, which is not illustrated in any more detail, and is also mounted in a floating form, so that any geometric movements of the frame apparatus 20 in relation to the axial position of the brake disk 16 on the drive shaft 12 are compensated for particularly well.

The frame apparatus 20 has a frame base 22 which essentially is in an annular form, with the drive shaft 12 passing through the annular hole. On the side of the frame base 22 which points in the axial direction with respect to the drive shaft 12, a number of rod elements 24, for example six of them, are connected to one end thereof, while the respective other end of the rod elements 24 is connected to a covering ring 26.

The frame base 22, the rod elements 24 together with the covering ring 26 form a type of cage which surrounds the brake disk with its brake pads 18. A frame element 28 is arranged between the brake disk 16 and the frame base 22, is likewise in the form of a disk and also has further recesses, through which the rod elements 24 are passed, in addition to a central recess through which the drive shaft 12 is passed. This results in the frame element 28 being guided in such a way as to allow the rod elements 24 to move in the axial direction.

In its radially outer area, the frame base 22 has further recesses which point towards the covering ring 26 and in which one end of the rod elements 24 is arranged. Each rod element 24 is surrounded by a spring 30, which is in the form of a helical compression spring. The springs 30 are on the one hand passed through the recesses 32 and on the other hand through the rod elements 24 and expand essentially only in one axial direction, with their length and compression force being designed such that the frame element 28 is pressed against the brake disk 16 and against the brake pad 18, which points towards the frame element 28.

FIG. 1 thus shows the braking apparatus 10 in the "brake closed" state, that is to say the drive shaft 12 cannot move, even when the drive is activated, corresponding to the selected braking forces. The braking apparatus 10 will generally, by virtue of its design, apply larger braking forces than the maximum drive forces which are introduced by the drive shaft 12.

The frame base 22 also has an additional recess 34, whose opening once again points towards the frame element 28, with electromagnets 36 being arranged in this additional recess 34. The connections and actuation of these electromagnets 36 is not shown in this figure, since they are generally known to those skilled in the art. However, they are designed such that, when activated, the frame element 28 (which is expediently manufactured from a magnetic material) is attracted by the magnetic forces and against the spring forces of the helical springs 30 until the frame element 28 comes into contact with the frame base 22, as a stop.

The position of the frame element 28 as shown in the single FIGURE is intended to be referred to as the first position or the "brake closed" state, and, when the electromagnets 36 are activated, that is to say when the frame element 28 is making direct contact with the frame base 22 as a result of the magnetic forces, this is intended to be referred to as the second position of the frame element 28, or as the "brake open" state.

The method as claimed in the invention for identification of a brake state of the braking apparatus of a robot drive will be described in the following text with reference to the braking apparatus according to the invention that is illustrated in the single figure.

Appropriate forces are applied by means of the spring forces of the springs 30 to the frame element 28, which presses against the corresponding brake pad 18 on the brake disk 16. The forces result in the braking apparatus moving in its floating suspension in such a way that the covering ring 26 also in the end presses against the other brake pad 18 of the brake disk 16 as a redition bearing, so that the brake disk 16 is fixed between the frame element 28 and the covering ring 26. The braking forces are introduced into the brake disk 16 in this way. The braking forces are in this case of such a magnitude that the drive shaft 12 will not move at all, that is to say even in the situation when the drive motor is switched on in order to drive the drive shaft 12. If the brake is now released, for example because the robot drive has been released, the electromagnets 36 are activated so that an electromagnetic field is formed of such a magnitude that the frame element 28 is also moved towards the frame base 22, against the spring forces of the springs 30. The frame element is thus moved from the first position to the second position. In a corresponding manner, the braking apparatus state changes from "closed" to "open".

Brake designs are also in any case feasible which change from the open state to the closed state by activation of the electromagnet 36. However, the first-mentioned configuration is preferable since this corresponds to a fail-safe principle of reliable design, that is to say, particularly if the electrical power fails, the brake will move to the safe closed state, so that the robot can no longer move at all.

The distance of the frame element 28 in its positions between its first position and its second position is, in particular, dependent on the axial thickness of the brake disk 16 and of the two brake pads 18. Thus, over the course of use, the brake pads 18 will wear away over the course of the operating time, so that their thickness decreases, and the distance between the covering ring 26 and the frame element 28 is reduced. In a corresponding manner, the maximum distance 38 between the frame element 28 and the frame base 22 is increased. The distance between the electromagnets 36 and the frame element 28 is also increased in this way. Corresponding to this change in the distance, a greater magnetic field, that is to say a greater current level through the electromagnets 36, will be required in order to move the frame element 28 from its first position to the second position.

In the illustrated embodiment of the subject matter of the invention, the current level is used as a measurement signal, by means of which the distance between the frame element 28 and the frame base 22 is determined.

The amount of wear of the brake pads 16 can be identified in a particularly simple manner in this way, that is to say also for example the limit of specific permissible reduction in the brake pad thickness. In a corresponding manner, if the measured current levels are excessive and exceed the limit value, the distance between the first position and the second position of the frame element 28 is correspondingly increased, with the converse conclusion being that the brake pad thickness has been reduced such that the braking apparatus is no longer in a serviceable state. These limit overshoots are transmitted to an evaluation system, which is not illustrated in the figure but is carried out an appropriate control action or emits a control signal, for example commanding that the robot be stopped.

The current level signal is, however, also used in an entirely general form for determination of the brake pad thickness, that is to say not only to determine that the brake state of the brake is not permissible but also to determine each brake state which represents a specific level of wear of the brake or the brake pads.

One method which is advantageous for statistical reasons for detection of the wear limit or of the brake state is to use the current level profile overall as a measurement signal and thus to determine the brake state on the basis of a broader database from the comparison of the measurement signal with a reference value or with reference values.

The signal evaluation and the detection of the brake state are particularly advantageously carried out in the robot control itself. This correspondingly minimizes the hardware complexity that has to be accepted.

FIG. 2 shows a graph 40 with measured value examples, on the basis of which the performance of the method according to the invention is intended to be illustrated. For this purpose, the current level which is supplied to the electromagnets 36 in order to form an electromagnetic field is plotted on an X axis 42. The braking torque which is applied by the braking apparatus 10 to the drive shaft 12 and is measured, for example, by means of an appropriate measurement device is plotted on a Y axis 44.

A first case first of all illustrates an example of a brake in a serviceable state, with the brake exerting its maximum braking force at a first point 46 when no current is flowing through the electromagnets. When the brake is new, the corresponding brake pads 18 have their maximum thickness, resulting in a first curve 48 which illustrates that the braking forces are gradually decreased as the current level rises until they are completely overcome at a second point 50, so that this is referred to as the state in which the brake is fully open. The first curve 48 is a straight line, since the braking torques depend linearly on the current level.

The second curve 52 illustrates a correspondingly flatter curve starting from the same first point 46 and indicating a state of the braking apparatus 10 in which the brake pads 18 have already been partially worn. Correspondingly greater current levels must be applied in order to move the braking apparatus 10 to the "completely open" state, as is indicated by the third point 54, which is located correspondingly further to the right in the figure.

Two further curves, specifically a third curve 56 and a fourth curve 58, once again show the braking apparatus 10 with new and worn brake pads 18. However, in this case, the curves start from a fourth point as the starting point, which is located on the Y axis 44 and results in a lower braking torque than the starting point of the first curve 48 and of the second curve 52 at the first point 46. Since this is the same braking apparatus 10, the reduced braking torques are explained by the fact that there is a cause that is influencing the braking performance and thus the maximum braking torque disadvantageously. In the chosen example, this is oil, which reduces the coefficient of friction between the brake pads and the frame apparatus 20 or the frame element 28. The example has in this case been chosen such that the end points of the third curve 46 are located at the second point 50, and the end point of the fourth curve 58 is located at the third point 54.

The figure also shows two dashed lines, a first line 62 and a second line 64, which are arranged horizontally with respect to the X axis 42 for two Y values, possibly for a lower Y value and a higher Y value. The Y values are in this case chosen essentially arbitrarily and are intended only to indicate that just two points are required to determine the gradient of the corresponding straight lines, which points are required in order to determine the position of the straight lines at the diagram point, using appropriate symbols for the intersection points of the curves 48, 52, 58, 56 with the lines 62, 64. Once the positions of the straight lines and their gradients are known, it is possible to use the known braking behaviour of the brake when subjected to various influences to determine on the one hand the brake state of the brake itself, as shown by the two curve pairs 48, 52 and 56, 58. On the other hand, by determining the point of origin, that is to say of the maximum braking torques, symbolized by the first point 46 and the fourth point 60, it is possible to determine further influencing factors which reduce the braking performance or the braking torque.

It has been found that the following method procedure for the method according to the invention leads to particularly good results when an electromagnetically operating holding apparatus is used for the braking apparatus and the following method steps are carried out:

First of all, the brake is operated such that the motor shaft is stopped. The drive torque is then raised to a first, previously defined value. A control apparatus now starts to increase the current level and/or the voltage on the holding apparatus for the brake. This correspondingly reduces the braking torque. As soon as the motor shaft moves, the first measurement point is reached and the corresponding value for the current level and, if appropriate, the voltage are stored, for example in the control apparatus.

A second value for the current level and possibly the voltage is determined and stored using a corresponding procedure, so that two points are now measured, defining the straight line as shown in FIG. 2. The difference from the first measurement is thus that a different drive torque is chosen, as a result of which the motor starts to rotate at a different braking torque limit than in the case of the first measurement.

| List of reference symbols |
|---|
| 10 Braking apparatus |
| 12 Drive shaft |
| 14 Connecting element |
| 16 Brake disk |
| 18 Brake pad |
| 20 Frame apparatus |
| 22 Frame base |
| 24 Rod elements |
| 26 Covering ring |
| 28 Frame element |
| 30 Spring |
| 32 Recess |
| 34 Recess |
| 36 Electromagnets |
| 38 Distance |
| 40 Graph |
| 42 X axis |
| 44 Y axis |
| 46 First point |
| 48 First curve |
| 50 Second point |
| 52 Second curve |
| 54 Third point |
| 56 Third curve |
| 58 Fourth curve |
| 60 Fourth point |
| 62 First line |
| 64 Second line |

The invention claimed is:

1. A method for identification of a brake state of a braking apparatus of a robot drive having a frame apparatus which applies braking forces to a rotating component of the robot drive when required by means of a first moving frame element, with the braking apparatus in at least two operating states, the method comprising:
 recording brake torsion values, which are measured at least at two different current levels or on a current level profile, as at least one measurement signal during the transition of the braking apparatus from one of the operating states to the other one of the operating states of the braking apparatus; and determining a brake state of the braking apparatus by the recorded at least one measurement signal with previously defined reference values.

2. The method as claimed in claim 1, wherein the first frame element is moved from a first position to a second position.

3. The method as claimed in claim 2, wherein the first position is a closed state of the braking apparatus, and the second position is an open state of the brakinq apparatus.

4. The method as claimed in claim 1, wherein the first frame element is moved from the first position to the second position by means of at least one electromagnetically acting holding apparatus.

5. The method as claimed in claim 4, wherein the first frame element is moved to one of the positions by a resetting apparatus when the holding apparatus is in the deactivated state.

6. The method as claimed in claim 5, wherein the first frame element is moved to a fail-safe position by means of the resetting apparatus.

7. The method as claimed in claim 4, wherein the required current level or the current level profile for the holding apparatus to move the first frame element from the first position to the second position is used as the measurement signal.

8. The method as claimed in claim 1, wherein a first measurement of brake torsion values is carried out in the region of 5% to 30% of a maximum current level.

9. The method as claimed in claim 8, comprising:
measuring other force-equivalent preset values for movement of the first frame element from a first position to a second position as the at least one measurement signal.

10. The method as claimed in claim 1, wherein a second measurement of brake torsion values is carried out in the range from 70% to 95% of a maximum current level.

11. The method as claimed in claim 10, comprising:
measuring other force-equivalent preset values for movement of the first frame element from a first position to a second position as the at least one measurement signal.

12. The method as claimed in claim 1, wherein further causes which influence the braking performance of the braking apparatus are detected by means of the reference values.

13. The method as claimed in claim 12, wherein the further causes which influence the braking performance of the braking apparatus include oil in an area of at least one of the frame apparatus and the first frame element.

14. The method as claimed in claim 1, wherein the distance of the first frame element from the first position to the second position is determined by the at least one measurement signal.

15. The method as claimed in claim 1, wherein the number of hours for which the braking apparatus has already been operated are taken into account by means of the reference values.

16. The method as claimed in claim 1, wherein the at least one of the recording of the at least one measurement signal recording and the comparison are carried out by means of robot control.

17. The method as claimed in claim 1, comprising:
measuring other force-equivalent preset values for movement of the first frame element from a first position to a second position as the at least one measurement signal.

18. A braking apparatus for a robot drive, the braking apparatus comprising:
a braking element;
a drive shaft on which the braking element is arranged;
a frame apparatus configured to apply braking forces to the braking element when required, the frame apparatus including a first frame element configured to be moved to a first position and a second position, with one of the positions corresponding to an open state of the braking element and the other one of the positions corresponding to a closed state of the braking apparatus;
a measurement apparatus configured to record brake torsion values brake torsion values, which are measured at least at two different current levels or on a current level profile, as at least one measurement signal for a distance of the first frame element between its first and second positions; and
an evaluation apparatus configured to determine a brake state of the braking apparatus , by comparing the measurement signal with a reference value.

19. The braking apparatus as claimed in claim 18, comprising:
an electromagnetically acting holding apparatus configured to move the first frame element from the first position to the second position.

20. The braking apparatus as claimed in claim 19, wherein the measurement signal is the required current level or the current level profile of the holding apparatus.

21. The braking apparatus as claimed in claim 19, comprising:
a distance sensor configured to measure the at least one measurement signal.

22. The braking apparatus as claimed in claim 19, wherein the holding apparatus comprises the measurement apparatus.

23. The braking apparatus as claimed in claim 18, wherein the braking element is a brake disk with or without brake pads.

24. The braking apparatus as claimed in claim 18, comprising a resetting apparatus configured to at least one move the first frame element to the first position, and hold the first frame element in the first position.

* * * * *